(12) United States Patent
Mizukoshi

(10) Patent No.: US 12,413,826 B2
(45) Date of Patent: Sep. 9, 2025

(54) COMMUNICATION CONTROL DEVICE, COMMUNICATION CONTROL SYSTEM, COMMUNICATION CONTROL METHOD, AND NON-TRANSITORY COMPUTER-READABLE MEDIUM STORING PROGRAM

(71) Applicant: NEC Corporation, Tokyo (JP)

(72) Inventor: Yasuhiro Mizukoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 242 days.

(21) Appl. No.: 18/021,958

(22) PCT Filed: Sep. 30, 2020

(86) PCT No.: PCT/JP2020/037224
§ 371 (c)(1),
(2) Date: Feb. 17, 2023

(87) PCT Pub. No.: WO2022/070333
PCT Pub. Date: Apr. 7, 2022

(65) Prior Publication Data
US 2023/0353837 A1 Nov. 2, 2023

(51) Int. Cl.
*H04N 21/647* (2011.01)
*G06V 20/56* (2022.01)
*H04N 21/2347* (2011.01)

(52) U.S. Cl.
CPC ........... *H04N 21/647* (2013.01); *G06V 20/56* (2022.01); *H04N 21/2347* (2013.01)

(58) Field of Classification Search
CPC ... H04N 21/647; H04N 21/2347; G06V 20/56
See application file for complete search history.

(56) References Cited

U.S. PATENT DOCUMENTS

2015/0271493 A1* 9/2015 Okazaki ................. H04N 19/16
348/211.11
2016/0173805 A1* 6/2016 Claus ................. H04N 21/4223
348/148

(Continued)

FOREIGN PATENT DOCUMENTS

JP 357365 B2 * 10/2004
JP 3573653 B2 * 10/2004 ............. H04N 7/181

(Continued)

OTHER PUBLICATIONS

International Search Report for PCT Application No. PCT/JP2020/037224, mailed on Dec. 1, 2020.

(Continued)

*Primary Examiner* — Rowina J Cattungal

(57) ABSTRACT

According to an example embodiment, a communication control device includes an acquisition unit configured to acquire video quality information of first video data on a display device detected, based on a transmission status of the first video data transmitted by a first imaging device and a reception status of the first video data on the display device that receives the first video data via a network; and a control unit configured to control a transmission condition of the first video data transmitted from the first imaging device to the display device based on the video quality information of the first video data acquired by the acquisition unit.

7 Claims, 12 Drawing Sheets

(56) References Cited

U.S. PATENT DOCUMENTS

| | | | |
|---|---|---|---|
| 2019/0044992 A1* | 2/2019 | Kikkawa | H04N 21/262 |
| 2019/0327463 A1* | 10/2019 | Zhao | H04N 19/103 |
| 2021/0389780 A1* | 12/2021 | Cui | G08G 1/096716 |

FOREIGN PATENT DOCUMENTS

| | | |
|---|---|---|
| JP | 2007-329707 A | 12/2007 |
| JP | 2011-139200 A | 7/2011 |
| JP | 2012-080518 A | 4/2012 |
| JP | 2014-200005 A | 10/2014 |
| JP | 2016-178419 A | 10/2016 |
| JP | 2019-029931 A | 2/2019 |
| WO | 2014/061181 A1 | 4/2014 |

OTHER PUBLICATIONS

JP Office Communication for JP Application No. 2022-553327, mailed on Feb. 20, 2024 with English Translation.

* cited by examiner

COMMUNICATION CONTROL DEVICE, COMMUNICATION CONTROL SYSTEM, COMMUNICATION CONTROL METHOD, AND NON-TRANSITORY COMPUTER-READABLE MEDIUM STORING PROGRAM This application is a National Stage Entry of PCT/JP2020/037224 filed on Sep. 30, 2020, the contents of all of which are incorporated herein by reference, in their entirety.

TECHNICAL FIELD

The present invention relates to a communication control device, a communication control system, a communication control method, and a non-transitory computer-readable medium storing a program.

BACKGROUND ART

Patent Literature 1 discloses a video wireless transmission device that optimizes video qualities by following a change in transmission capacity in a wireless section when video streaming data is transmitted in the wireless section.

Patent Literature 2 discloses a video transmission system that preferentially transmits information important for a video by combining a network bandwidth adjustment technique for adjusting a transmission data amount according to a network state and an image recognition technique for detecting contents appearing in a transmission video.

CITATION LIST

Patent Literature

Patent Literature 1: Japanese Unexamined Patent Application Publication No. 2007-329707
Patent Literature 2: Japanese Unexamined Patent Application Publication No. 2012-080518

SUMMARY OF INVENTION

Technical Problem

In Patent Literature 1, an adaptive control unit provided in a transmission-side transmission device optimizes video qualities of video data without referring to a reception status of video data in a reception-side transmission device. That is, in Patent Literature 1, the information relating to the reception status of the video data in the reception-side transmission device is not fed back to the transmission-side transmission device. Therefore, there is a problem that the transmission-side transmission device cannot accurately set the transmission condition of the video data transmitted from the transmission-side transmission device to the reception-side transmission device.

In addition, in Patent Literature 2, a terminal device on a transmission side compresses and encodes video data without referring to a reception status of the video data in a terminal device on the reception side. That is, in Patent Literature 2, the information relating to the reception status of the video data in the terminal device on the reception side is not fed back to the terminal device on the transmission side. Therefore, there is a problem that the terminal device on the transmission side cannot accurately set the transmission condition of the video data transmitted to the terminal device on the reception side.

The present disclosure has been made to solve such a problem and has an object of providing a communication control device, a communication control system, a communication control method, and a non-transitory computer-readable medium storing a program, which can accurately set communication conditions.

Solution to Problem

According to the present disclosure, a communication control device includes an acquisition unit configured to acquire video quality information of first video data on a display device detected, based on a transmission status of the first video data transmitted by a first imaging device and a reception status of the first video data on the display device that receives the first video data via a network; and a control unit configured to control a transmission condition of the first video data transmitted from the first imaging device to the display device based on the video quality information of the first video data acquired by the acquisition unit.

According to the present disclosure, a communication control method includes an acquisition step of acquiring video quality information of first video data on a display device detected, based on a transmission status of the first video data transmitted by a first imaging device and a reception status of the first video data on the display device that receives the first video data via a network; and a control step of controlling a transmission condition of the first video data transmitted from the first imaging device to the display device based on the video quality information of the first video data acquired in the acquisition step.

According to the present disclosure, a non-transitory computer-readable medium stores a communication control program for executing an acquisition process of acquiring video quality information of first video data on a display device detected, based on a transmission status of the first video data transmitted by a first imaging device and a reception status of the first video data on the display device that receives the first video data via a network; and a control process of controlling a transmission condition of the first video data transmitted from the first imaging device to the display device based on the video quality information of the first video data acquired in the acquisition process.

Advantageous Effects of Invention

According to the present disclosure, it is possible to provide a communication control device, a communication control system, a communication control method, and a non-transitory computer-readable medium storing a program, which can accurately set communication conditions.

EXAMPLE EMBODIMENT

Figure 1:
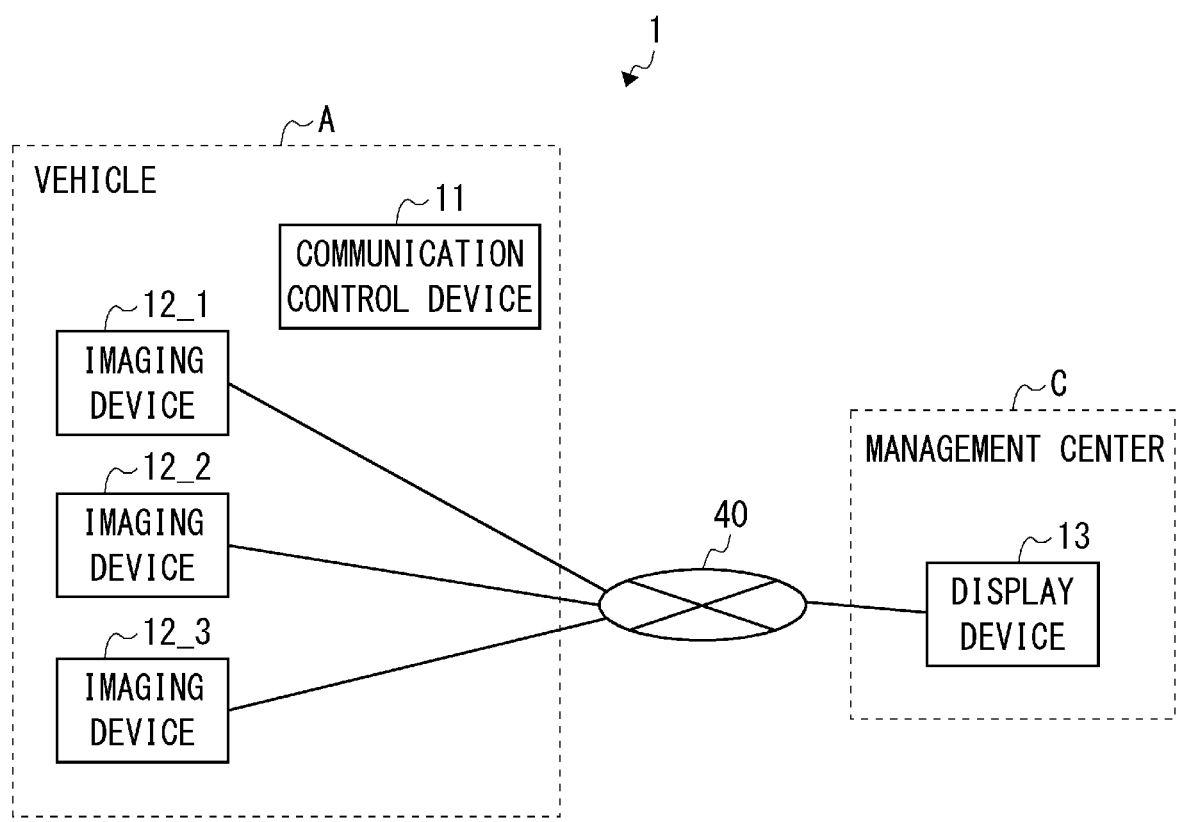
FIG. 1 is a block diagram illustrating a configuration example of a communication control system according to a first example embodiment.

Hereinafter, example embodiments of the present disclosure are described in detail with reference to the drawings. In the drawings, the same or corresponding elements are denoted by the same reference signs, and an overlapping description is omitted as necessary for clarity of description.
<Prior Study by Inventor>

Before a communication control device according to a first example embodiment and a communication control system including the communication control device will be described, contents examined in advance by the inventor will be described.

Figure 10:
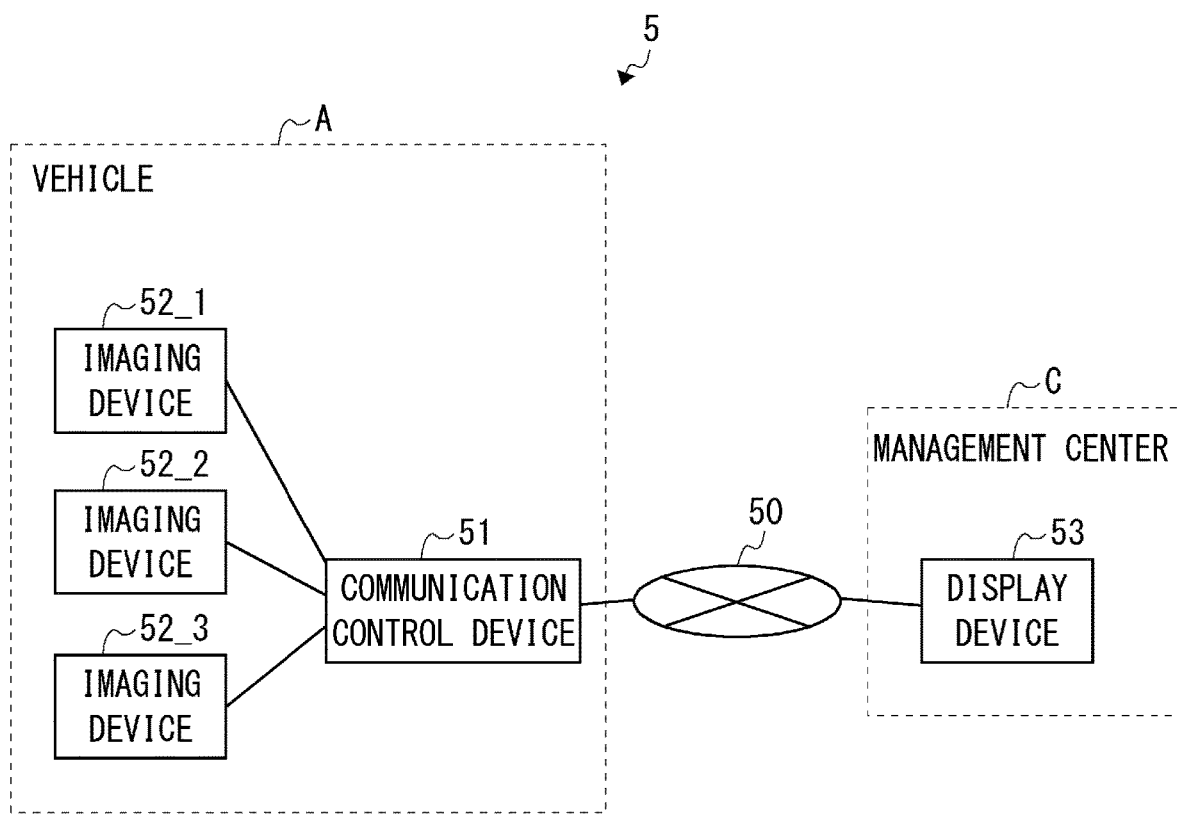
FIG. 10 is a block diagram illustrating a configuration example of a communication control system in a concept stage.

FIG. 10 is a block diagram illustrating a configuration example of a communication control system 5 in a concept stage before reaching the first example embodiment.

As illustrated in FIG. 10, the communication control system 5 includes a communication control device 51, a plurality of imaging devices 52_1 to 52_N (N is an integer of 1 or more), a display device 53, and a network 50. Here, a case where three imaging devices 52_1 to 52_3 are provided is described as an example. The communication control device 51 and the display device 53 are connected to each other via the network 50.

The imaging devices 52_1 to 52_3 are so-called cameras and are mounted, for example, on a vehicle A. For example, the imaging device 52_1 is installed to image the front of the vehicle A, the imaging device 52_2 is installed to image the rear of the vehicle A, and the imaging device 52_3 is installed to image the lateral direction of the vehicle A. For example, imaging priorities of the imaging devices 52_1 and 52_2 are set higher than the imaging priority of the imaging device 52_3. In addition, as the imaging priority is higher, it is required to generate video data with higher image qualities, and as the imaging priority is lower, it is allowed to generate video data with lower image qualities.

The communication control device 51 is also referred to as an adaptive network (NW) control device and is mounted on, for example, the vehicle A together with the imaging devices 52_1 to 52_3. The communication control device 51 controls communication between the imaging devices 52_1 to 52_3 and the display device 53.

For example, the communication control device 51 receives video data that is a video imaged by each of the imaging devices 52_1 to 52_3 and transmits the video data to the display device 53 via the network 50. Furthermore, the communication control device 51 receives, via the network 50, the data (feedback data) relating to a reception status of the video data in the corresponding display device 53 fed back from the display device 53.

Furthermore, the communication control device 51 controls the transmission conditions of the video data transmitted from respective imaging devices to the display device based on the transmission statuses of respective items of video data transmitted from the communication control device 51 to the display device 53 and the reception statuses of the respective items of the video data fed back from the display device 53. The transmission conditions of the video data transmitted from the respective imaging devices to the display device are, for example, parameters such as bit rates, frame rates, and resolutions of the video data set in the respective imaging devices.

The display device 53 includes a monitor that displays the videos imaged by the imaging devices 52_1 to 52_3 and is installed in, for example, a management center C. The display device 53 may display the videos imaged by the imaging devices 52_1 to 52_3 on individual monitors respectively or may display the videos imaged by the imaging devices 52_1 to 52_3 on a common monitor.

In addition, the display device 53 has a function of measuring the reception statuses of the respective items of the video data and feeding back the measurement result to the communication control device 51.
(Flow of Processing of Communication Control System 5)

Next, a flow of processing of the communication control system 5 is described with reference to FIGS. 11 and 12.

Figure 11:
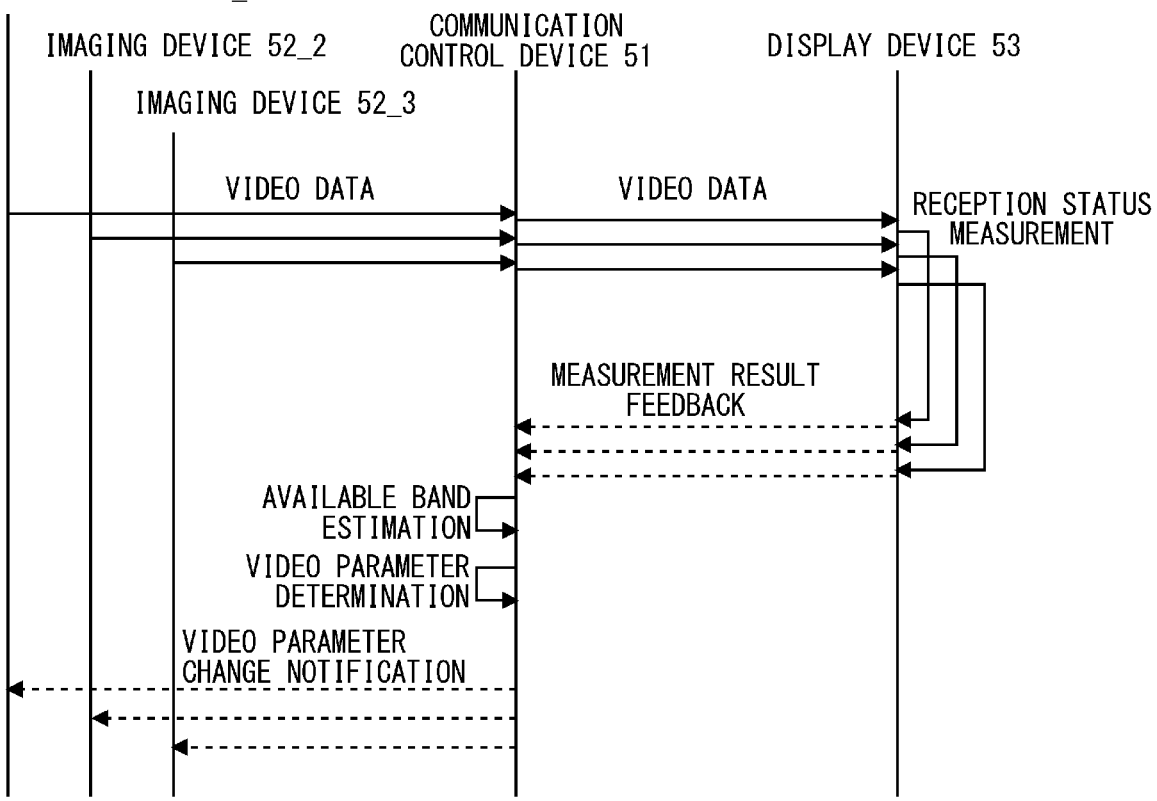
FIG. 11 is a diagram illustrating a flow of processing of the communication control system illustrated in FIG. 10.

FIG. 11 is a diagram illustrating the flow of the processing of the communication control system 5. FIG. 12 is a diagram illustrating details of the flow of the processing of the communication control system 5. FIG. 12 illustrates only processing of the imaging device 52_1 among the imaging devices 52_1 to 52_3.

First, the respective imaging devices 52_1 to 52_3 encrypt the video data, which are videos obtained by imaging a peripheral region of the vehicle A, and transmit the video data to the communication control device 51.

When receiving the encrypted video data transmitted from the respective imaging devices 52_1 to 52_3, the communication control device 51 decrypts the encrypted video data and acquires information (for example, the number of packets of the video data) relating to the transmission status of the corresponding video data from the decrypted video data. Thereafter, the communication control device 51 encrypts the decrypted video data again and transmits the encrypted video data to the display device 53 via the network 50.

When receiving the encrypted video data transmitted from the communication control device 51 via the network 50, the display device 53 decrypts the encrypted video data and displays the decrypted video data on the monitor.

At this point, the display device 53 measures the reception statuses (for example, the number of packets of the video data) of the respective items of video data. Then, the display device 53 encrypts the measurement results of the reception statuses of the respective items of video data and transmits (feeds back) the measurement results to the communication control device 51 via the network 50.

When receiving the measurement results of the reception statuses of the respective items of video data, which are fed back from the display device 53 and encrypted, via the network 50, the communication control device 51 decrypts the encrypted measurement results. Then, communication control device 51 estimates available communication bands of the respective items of video data based on the transmission statuses of the respective items of video data transmitted from communication control device 51 to the display device 53 and the reception statuses (measurement results) of the respective items of video data in the display device 53.

Figure 12:
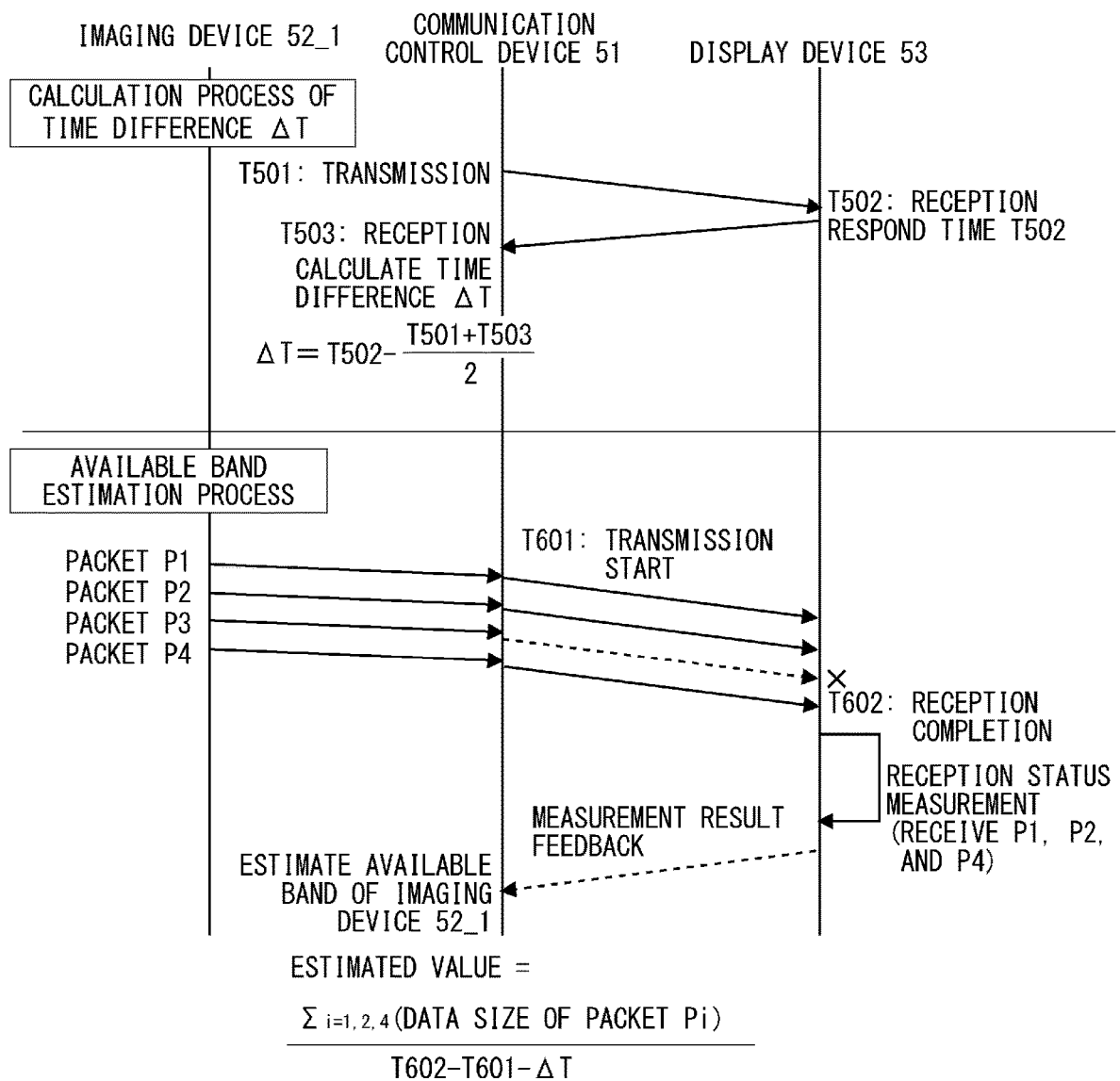
FIG. 12 is a diagram illustrating details of the flow of the processing of the communication control system illustrated in FIG. 10.

With reference to FIG. 12, the video data transmitted from the imaging device 52_1 to the display device 53 includes four video packets P1 to P4. On the other hand, the video data received by the display device 53 includes only three video packets P1, P2, and P4 among the four video packets P1 to P4.

At this time, the estimated value of the available communication band of the video data transmitted from the imaging device 52_1 to the display device 53 is expressed by Equation (1).

[Equation 1]

$$\text{Estimated value} = \frac{\sum_{i=1,2,4}(\text{Data size of packet } Pi)}{T602 - T601 - \Delta T} \quad (1)$$

Here, T601 represents a transmission start time of the video data by the communication control device 51. T602 represents a reception completion time of the video data by the display device 53. ΔT represents a time difference between a timer of the communication control device 51 and a timer of the display device 53. The time difference ΔT is calculated at a stage of an initialization operation before the normal operation. Hereinafter, an example of a method of calculating the time difference ΔT will be described.

At the time of the initialization operation, first, the communication control device 51 transmits dummy data to the display device 53 and records transmission time T501. When receiving the dummy data, the display device 53 returns information on reception time T502 to the communication control device 51. When receiving the reply from the display device 53, the communication control device 51 records reception time T503. Then, the communication control device 51 calculates a time difference ΔT as in Equation (2) using the information on the times T501, T502, and T503.

[Equation 2]

$$\Delta T = T502 - \frac{T501 + T503}{2} \quad (2)$$

When the estimated values of the available communication bands of the video data transmitted by the respective imaging devices 52_1 to 52_3 are calculated, next, the communication control device 51 determines transmission conditions of the respective items of video data based on the estimated values of the available communication bands of the respective items of video data and the imaging priorities of the respective imaging devices. Then, the communication control device 51 instructs the respective imaging devices 52_1 to 52_3 to change the transmission conditions of the video data to the transmission conditions determined by the communication control device 51. In other words, the communication control device 51 instructs the respective imaging devices 52_1 to 52_3 to change the parameters relating to the transmission of the videos to parameters determined by the communication control device 51.

As described above, in the communication control system 5, the communication control device 51 can accurately control the transmission conditions of the video data transmitted from the respective imaging devices to the display device by referring to the reception status of the video data on the display device 53 fed back from the display device 53. Furthermore, real-time transmission of the imaged video can be implemented.

Next, a communication control system according to a first example embodiment will be described. A communication control system 1 according to the first example embodiment can reduce the load on the communication control device and control communication conditions of the video data more accurately than in the case of the communication control system 5.

First Example Embodiment

FIG. 1 is a block diagram illustrating a configuration example of a communication control system according to the first example embodiment.

As illustrated in FIG. 1, the communication control system 1 includes a communication control device 11, a plurality of imaging devices 12_1 to 12_N (N is an integer of 1 or more), a display device 13, and a network 40. In the present example embodiment, a case where three imaging devices 12_1 to 12_3 are provided is described as an example. The imaging devices 12_1 to 12_3 and the display device 13 are connected to each other via a network 40. The communication control device 11 is connected to the imaging devices 12_1 to 12_3 via a transmission path but may be, of course, connected via the network 40.

(Imaging Devices 12_1 to 12_3)

The imaging devices 12_1 to 12_3 are so-called cameras and are mounted on, for example, a vehicle A. For example, the imaging device 12_1 is installed to image the front of the vehicle A, the imaging device 12_2 is installed to image the rear of the vehicle A, and the imaging device 12_3 is installed to image the lateral direction of the vehicle A. For example, imaging priorities of the imaging devices 12_1 and 12_2 are set higher than the imaging priority of the imaging device 12_3. In addition, as the imaging priority is higher, it is required to generate video data with higher image qualities, and as the imaging priority is lower, it is allowed to generate video data with lower image qualities.

Specific Configuration Example of Imaging Device 12_1

Figure 2:
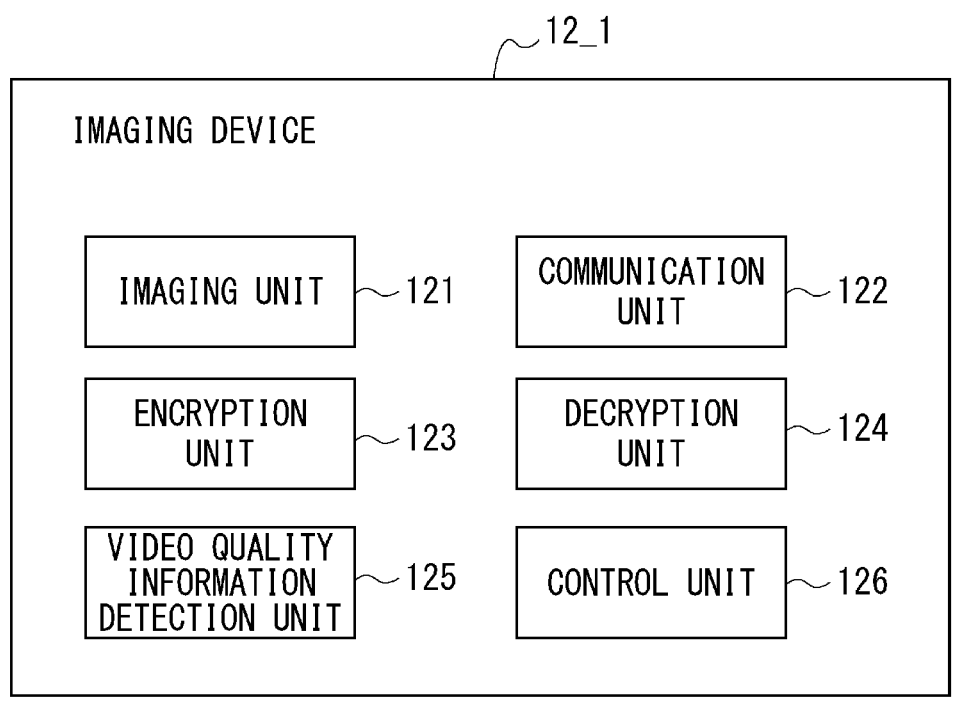
FIG. 2 is a block diagram illustrating a specific configuration example of an imaging device provided in the communication control system illustrated in FIG. 1.

FIG. 2 is a block diagram illustrating a specific configuration example of the imaging device 12_1. Since the configurations of the imaging devices 12_2 and 12_3 are basically the same as the configuration of the imaging device 12_1, and thus the description thereof is omitted.

As illustrated in FIG. 2, the imaging device 12_1 includes at least an imaging unit 121, a communication unit 122, an encryption unit 123, a decryption unit 124, a video quality information detection unit 125, and a control unit 126.

The imaging unit 121 images the periphery of the vehicle A.

The encryption unit 123 encrypts video data that is a video imaged by the imaging unit 121.

The communication unit 122 communicates with the network 40. As a result, the imaging device 12_1 equipped with the communication unit 122 can communicate with other devices (such as the display device 13) connected to the network 40. For example, the communication unit 122 transmits the video data encrypted by the encryption unit 123 to the display device 13 via the network 40 and receives the feedback data transmitted from the display device 13 via the network 40.

Furthermore, the communication unit 122 communicates with the communication control device 11 via the transmission path (not illustrated). Furthermore, the communication unit 122 transmits video quality information (described below) to the communication control device 11 and receives an instruction to change the transmission conditions of the video data transmitted from the communication control device 11.

The decryption unit 124 decrypts the encrypted data. For example, the decryption unit 124 decrypts the encrypted data fed back from the display device 13 (the encrypted data related to the reception status of the video data on the display device 13).

The video quality information detection unit 125 has a function of detecting video quality information of the video data based on the transmission status of the video data transmitted from the imaging device 12_1 to the display device 13 and the reception status of the video data on the display device 13 fed back from the display device 13. The video quality information is, for example, a difference between the number of packets of the video data transmitted from the imaging device 12_1 to the display device 13 and the number of packets of the video data received by the display device 13.

The control unit 126 generally controls each block provided in the imaging device 12_1.

(Display Device 13)

The display device 13 includes a monitor that displays the videos imaged by the imaging devices 12_1 to 12_3 and is install in, for example, the management center C. The display device 13 may display the videos imaged by the imaging devices 12_1 to 12_3 on individual monitors respectively or may display the videos imaged by the respective imaging devices 12_1 to 12_3 on a common monitor.

In addition, the display device 13 has a function of measuring the reception status of the video data from the imaging device 12_1 and the reception status of the video data from the imaging device 12_2 and feeding back the measurement results to the imaging devices 12_1 and 12_2, respectively.

Specific Configuration Example of Display Device 13

Figure 3:
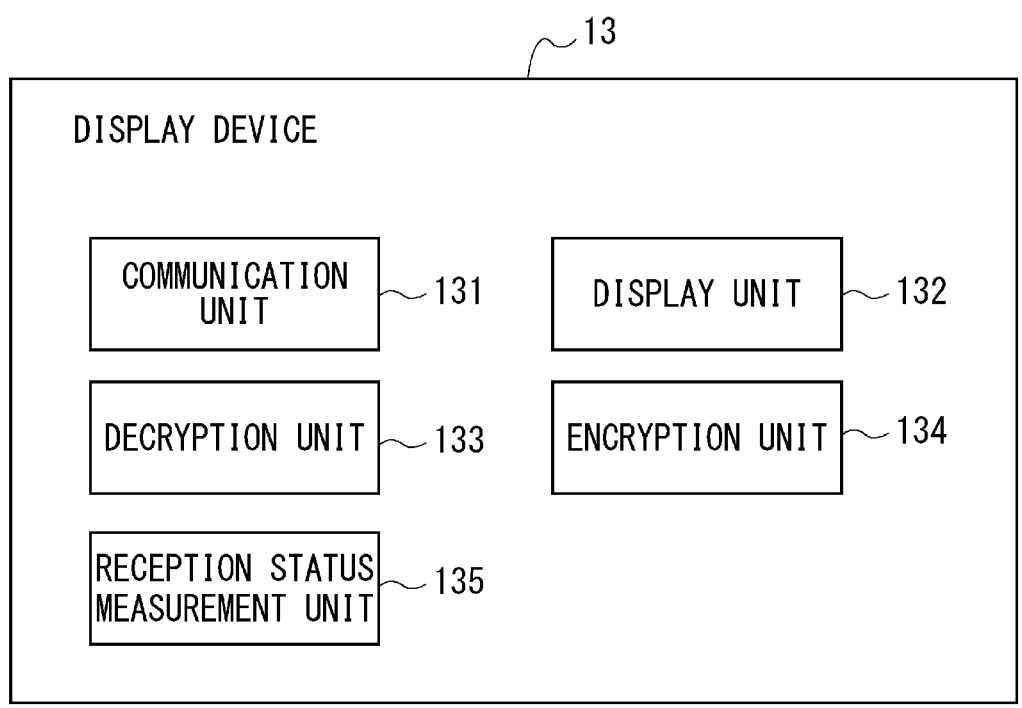
FIG. 3 is a block diagram illustrating a specific configuration example of a display device provided in the communication control system illustrated in FIG. 1.

FIG. 3 is a block diagram illustrating a specific configuration example of the display device 13.

As illustrated in FIG. 3, the display device 13 at least includes a communication unit 131, a display unit 132, a decryption unit 133, an encryption unit 134, and a reception status measurement unit 135.

The communication unit 131 communicates with the network 40. As a result, the display device 13 equipped with the communication unit 131 can communicate with other devices (such as the imaging devices 12_1 to 12_3) connected to the network 40. For example, the communication unit 131 receives the video data transmitted from the imaging devices 12_1 to 12_3 via the network and transmits (feeds back) the measurement results of the reception statuses of the respective items of video data to the imaging devices corresponding to the respective items of video data via the network 40. Therefore, the communication unit 131 can also be referred to as a feedback transmission unit.

The decryption unit 133 decrypts the encrypted data. For example, the decryption unit 133 decrypts the encrypted video data from the respective imaging devices 12_1 to 12_3.

The display unit 132 is a so-called monitor and displays videos of respective items of video data decrypted by the decryption unit 133. The reception status measurement unit 135 measures the reception statuses of the respective items of video data decrypted by the decryption unit 133. The encryption unit 134 encrypts the measurement result by the reception status measurement unit 135.

The measurement results of the reception statuses of respective items of video data encrypted by the encryption unit 134 are transmitted as feedback data by the communication unit 131 to the imaging devices corresponding to the respective items of video data via the network 40.

(Communication Control Device 11)

The communication control device 11 is also referred to as an adaptive network (NW) control device and is mounted on, for example, the vehicle A together with the imaging devices 12_1 to 12_3. The communication control device 11 controls the transmission conditions of the video data transmitted from the respective imaging devices 12_1 to 12_3 to the display device 13. The transmission conditions of the video data transmitted from the respective imaging devices 12_1 to 12_3 to the display device 13 are, for example, parameters such as bit rates, frame rates, and resolutions of the video data set in the respective imaging devices.

Furthermore, unlike the case of the communication control device 51, the communication control device 11 does not relay (deliver) the video data transmitted from the respective imaging devices 12_1 to 12_3 to the display device 13. As a result, the burden on the communication control device 11 is reduced.

Specific Configuration Example of Communication Control Device 11

Figure 4:
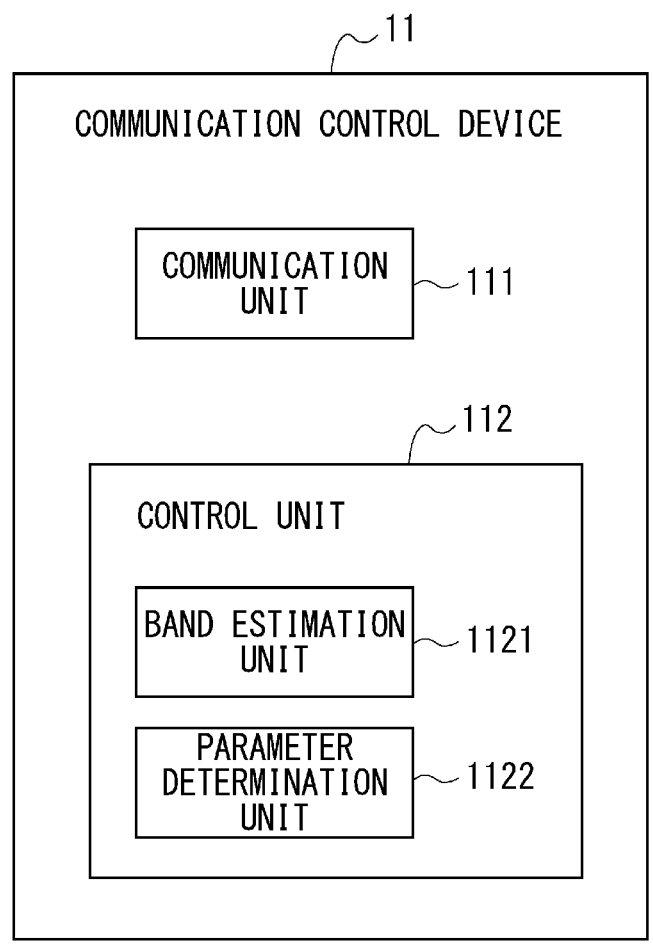
FIG. 4 is a block diagram illustrating a specific configuration example of a communication control device provided in the communication control system illustrated in FIG. 1.

FIG. 4 is a block diagram illustrating a specific configuration example of the communication control device 11.

As illustrated in FIG. 4, the communication control device 11 includes at least a communication unit 111 and a control unit 112.

Furthermore, the communication unit 111 communicates with the respective imaging devices 12_1 to 12_3 via the transmission path (not illustrated). For example, the communication unit 111 receives (acquires) the video quality information transmitted from the respective imaging devices 12_1 to 12_3 and transmits instructions to change the transmission conditions of the video data to the respective imaging devices 12_1 to 12_3. The communication unit 111 can also be referred to as an acquisition unit that acquires the video quality information.

The control unit 112 controls the transmission conditions of the video data transmitted from the respective imaging devices 12_1 to 12_3 to the display device 13 based on the acquired video quality information.

Specifically, the control unit 112 includes a band estimation unit 1121 and a parameter determination unit 1122. The band estimation unit 1121 estimates available communication bands of the respective items of video data from the acquired video quality information. Then, the parameter determination unit 1122 determines the transmission conditions of the video data transmitted from the respective imaging devices 12_1 to 12_3 to the display device 13 based on at least the estimated values of the available communication bands of the respective items of video data.

(Flow of Processing of Communication Control System 1)

Next, a flow of processing of the communication control system 1 is described with reference to FIGS. 5 and 6.

Figure 5:
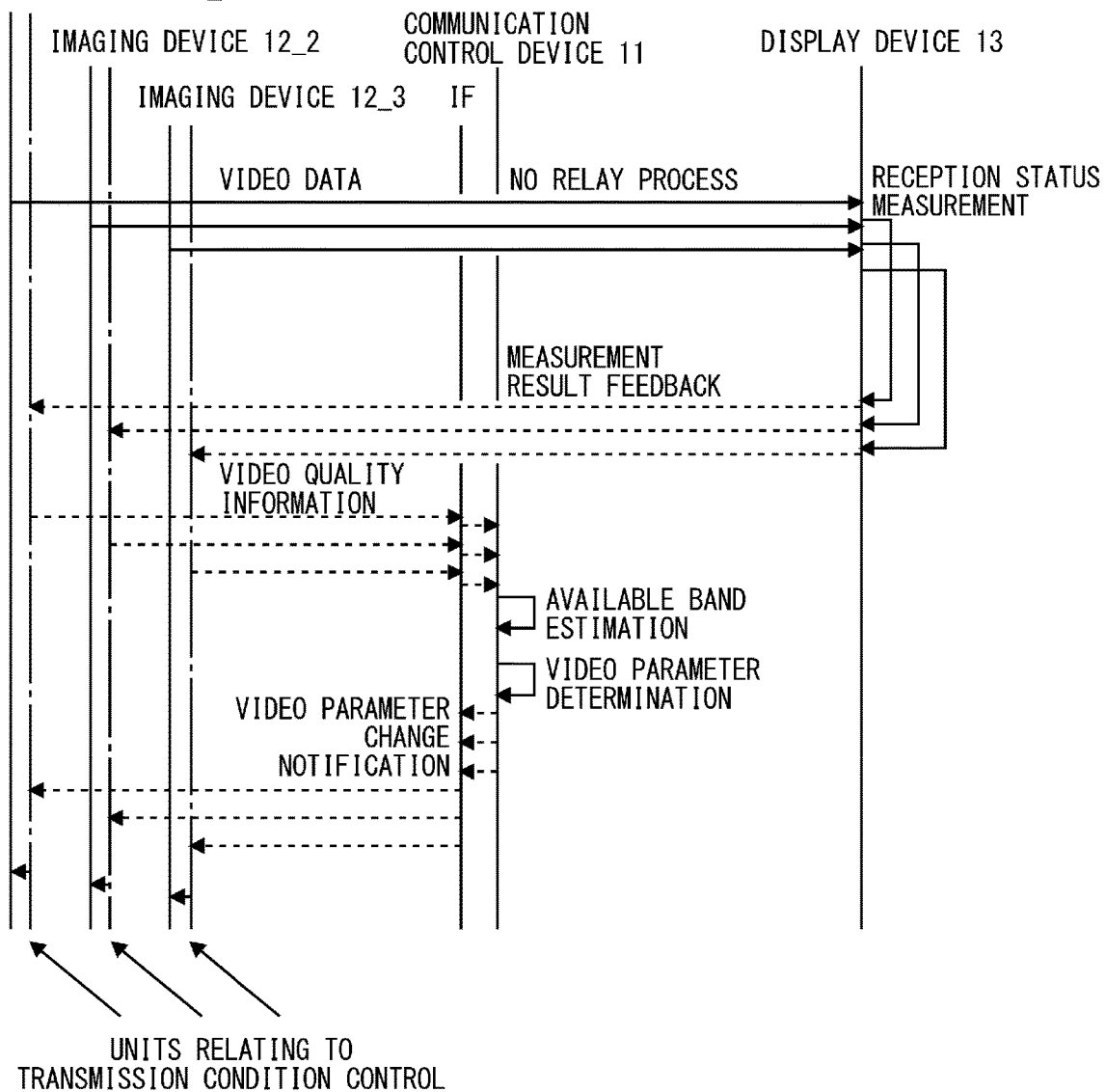
FIG. 5 is a diagram illustrating a flow of processing of the communication control system illustrated in FIG. 1.

FIG. 5 is a diagram illustrating the flow of the processing of the communication control system 1. FIG. 6 is a diagram illustrating details of the flow of the processing of the communication control system 1. FIG. 6 illustrates only processing of the imaging device 12_1 among the imaging devices 12_1 to 12_3.

First, the imaging devices 12_1 to 12_3 encrypt the video data, which are videos obtained by imaging a peripheral region of the vehicle A, and transmit the video data to the display device 13 via the network 40.

When receiving the encrypted video data transmitted from the imaging devices 12_1 to 12_3, the display device 13 decrypts the encrypted video data and displays the decrypted video data on the monitor (the display unit 132).

At this point, in the display device 13, the reception status measurement unit 135 measures the reception statuses (for example, the number of packets) of the respective items of video data. Then, the display device 13 encrypts the measurement results of the reception statuses of the respective items of video data and transmits (feeds back) the encrypted measurement results to the imaging devices corresponding to the respective items of video data via the network 40.

When receiving the measurement results of the reception statuses of the respective items of video data, which are fed back from the display device 13 and encrypted, via the network 40, the imaging devices 12_1 to 12_3 decrypt the encrypted measurement results. Then, the imaging devices 12_1 to 12_3 transmit information including the transmission status of the video data transmitted to the display device 13 and the reception status (measurement result) of the video data on the display device 13 or a difference therebetween to the communication control device 11 as the video quality information. The video quality information may be information including an estimated value of an available band calculated in the imaging device instead of the above information. In addition, the video quality information includes identification information of the imaging device and the like in addition to the above information.

When receiving the video quality information transmitted from the respective imaging devices 12_1 to 12_3, the communication control device 11 estimates the available communication bands of the respective items of video data based on the video quality information.

Figure 6:
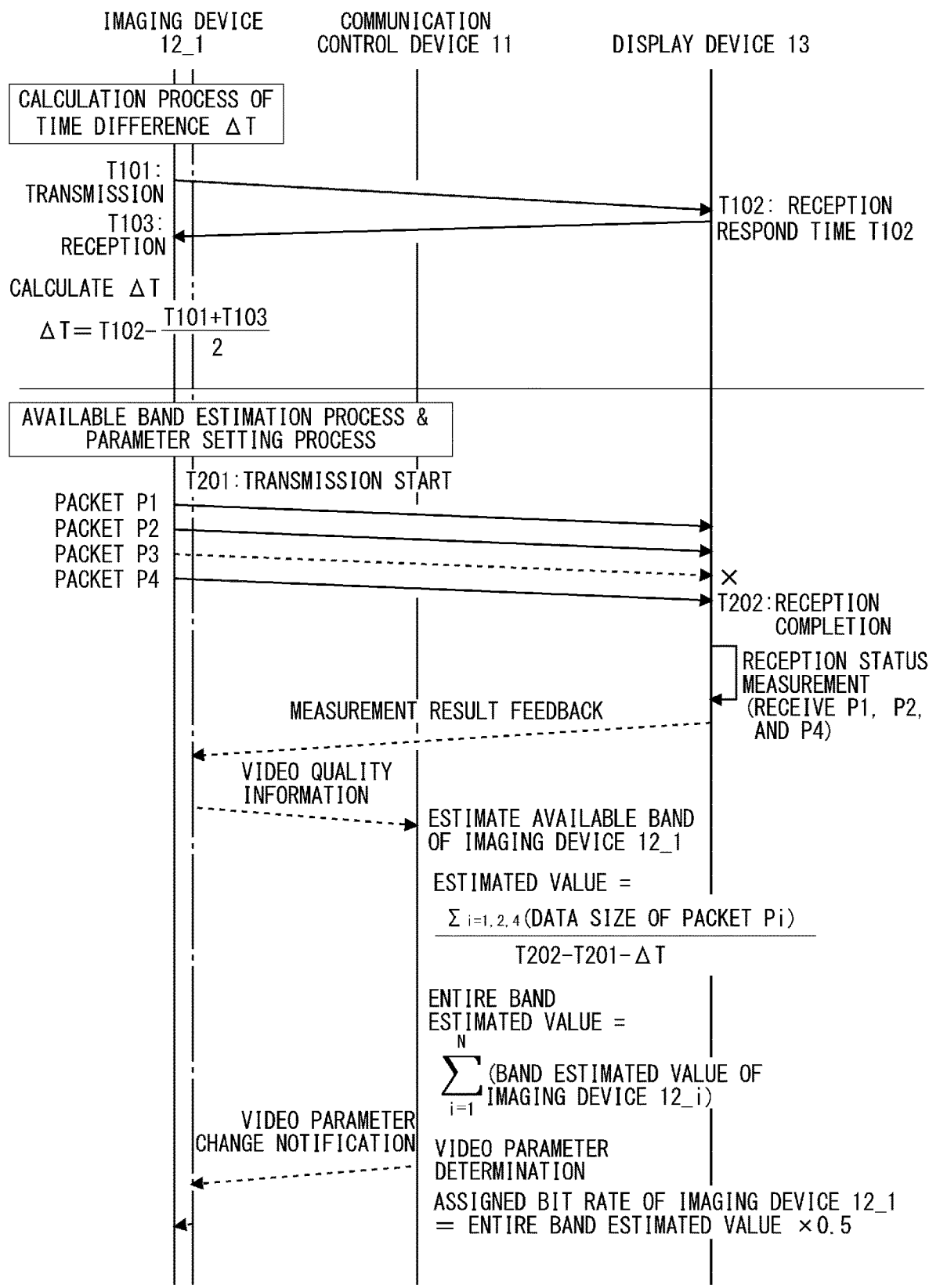
FIG. 6 is a diagram illustrating details of the flow of the processing of the communication control system illustrated in FIG. 1.

With reference to FIG. 6, the video data transmitted from the imaging device 12_1 to the display device 13 includes the four video packets P1 to P4. On the other hand, the video data received by the display device 13 includes only three video packets P1, P2, and P4 among the four video packets P1 to P4.

At this time, the estimated value of the available communication band of the video data transmitted by the imaging device 12_1 is expressed by Equation (3).

[Equation 3]

$$\text{Estimated value} = \frac{\sum_{k=1,2,4}(\text{Data size of packet } Pi)}{T202 - T201 - \Delta T} \quad (3)$$

Here, T201 represents a transmission start time of the video data by the imaging device 12_1. T202 represents a reception completion time of the video data by the display device 13. ΔT represents a time difference between a timer of the imaging device 12_1 and a timer of the display device 13. The time difference ΔT is calculated at a stage of an initialization operation before the normal operation. Hereinafter, an example of a method of calculating the time difference ΔT will be described.

At the time of the initialization operation, first, the imaging device 12_1 transmits dummy data to the display device 13 and records transmission time T101. When receiving the dummy data, the display device 13 returns information on reception time T102 to the imaging device 12_1. When receiving the reply from the display device 13, the imaging device 12_1 records reception time T103. Then, the imaging device 12_1 calculates the time difference ΔT as in Equation (4) using the information on the times T101, T102, and T103.

[Equation 4]

$$\Delta T = T102 - \frac{T101 + T103}{2} \quad (4)$$

When the estimated values of the available communication bands of the video data transmitted by the respective imaging devices 12_1 to 12_3 are calculated, next, the communication control device 11 determines the transmission conditions of the respective items of video data at least based on the estimated values of the available communication bands of the respective items of video data. In the present example, the communication control device 11 determines the transmission conditions of the respective items of video data based on the imaging priorities of the respective imaging devices in addition to the estimated values of the available communication bands of the respective items of video data.

In addition, since it is required to generate video data with high image qualities as the imaging priority is higher, a bit rate, a frame rate, a resolution, and the like are maintained as high as possible as the imaging priority is higher. In contrast, since it is allowed to generate video data with low image qualities as the imaging priority is lower, a bit rate, a frame rate, a resolution, and the like are adjusted to be lower as the imaging priority is lower.

Here, the estimated value (hereinafter, the entire band estimation value) of the entire communication band including the available communication bands of the respective imaging devices 12_1 to 12_3 is expressed as Equation (5).

[Equation 5]

Entire band estimation value = (5)

$$\sum_{i=1}^{N}(\text{Band estimation value of imaging device } 12\_i)$$

For example, the communication control device 11 determines the bit rate of the video data assigned to the imaging device 12_1 to be about 0.5 times the entire band estimation value.

Then, the communication control device 11 instructs the respective imaging devices 12_1 to 12_3 to change the transmission conditions of the video data to the transmission conditions determined by the communication control device 11. In other words, the communication control device 11 instructs the respective imaging devices 12_1 to 12_3 to change the parameters relating to the transmission of the videos to parameters determined by the communication control device 11.

As described above, in the communication control system 1, the communication control device 11 can accurately control the transmission conditions of the video data transmitted from the respective imaging devices to the display device by referring to the reception status of the video data on the display device 13 fed back from the display device 13. Furthermore, real-time transmission of the imaged video can be implemented.

Furthermore, unlike the case of the communication control device 51, in the communication control system 1, the communication control device 11 does not relay (deliver) the video data transmitted from the respective imaging devices 12_1 to 12_3 to the display device 13. As a result, the burden on the communication control device 11 is reduced.

In the present example embodiment, a case where the display device 13 is mounted in the management center C is described as an example, but the present invention is not limited thereto. The display device 13 may be mounted on, for example, a vehicle B.

Figure 7:
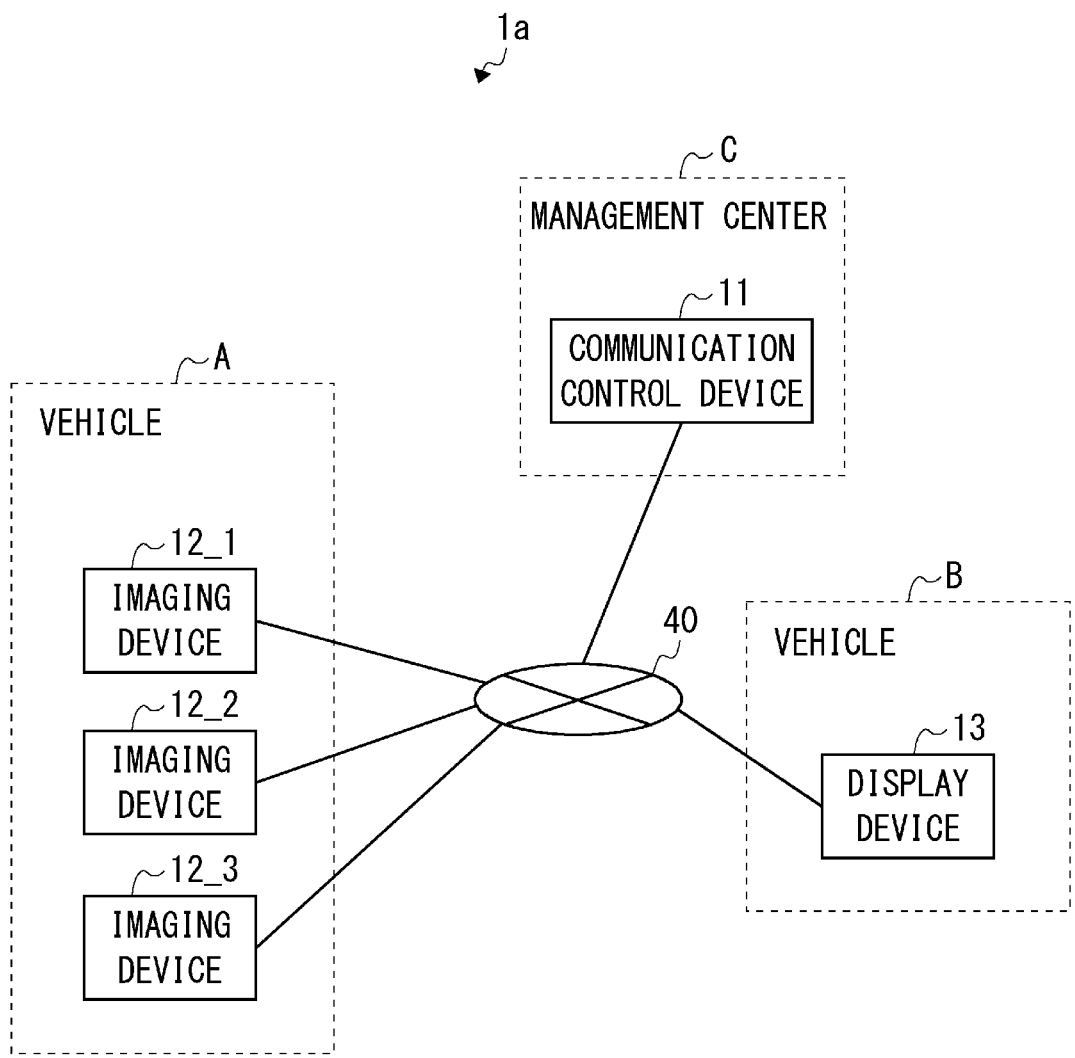
FIG. 7 is a diagram illustrating a first modification of the communication control system illustrated in FIG. 1.

FIG. 7 is a block diagram illustrating a first modification of the communication control system 1 as a communication control system 1a. In the example of FIG. 7, the display device 13 is mounted not in the management center C but in the vehicle B. In this case, for example, it is considered that the display device 13 is incorporated in a car navigation system of the vehicle B. In the example of FIG. 7, the communication control device 11 is mounted not on the vehicle A but in the management center C and controls communication conditions of video data between the vehicles A and B.

In addition, in the present example embodiment, a case where the three imaging devices 12_1 to 12_3 are mounted on the vehicle A is described as an example, but the present invention is not limited thereto. For example, one imaging device 12 (corresponding to the imaging device 12_1) may be mounted on the vehicle A.

Figure 8:
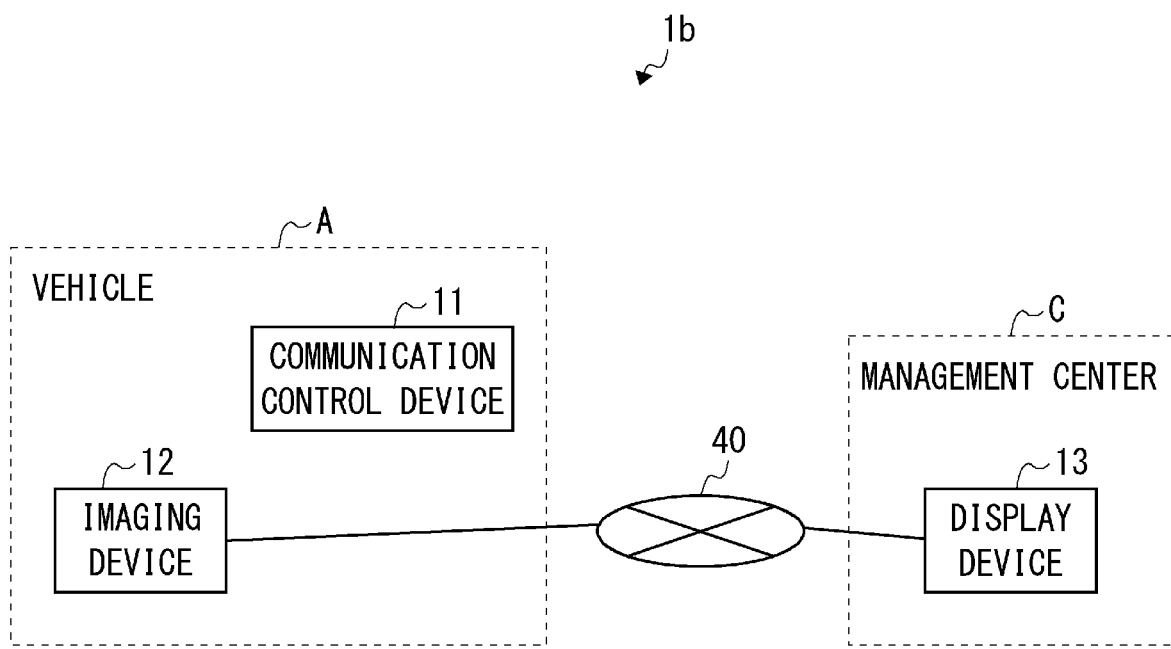
FIG. 8 is a diagram illustrating a second modification of the communication control system illustrated in FIG. 1.

FIG. 8 is a block diagram illustrating a second modification of the communication control system 1 as a communication control system 1b. In the example of FIG. 8, one imaging device 12 is mounted on the vehicle A.

Figure 9:
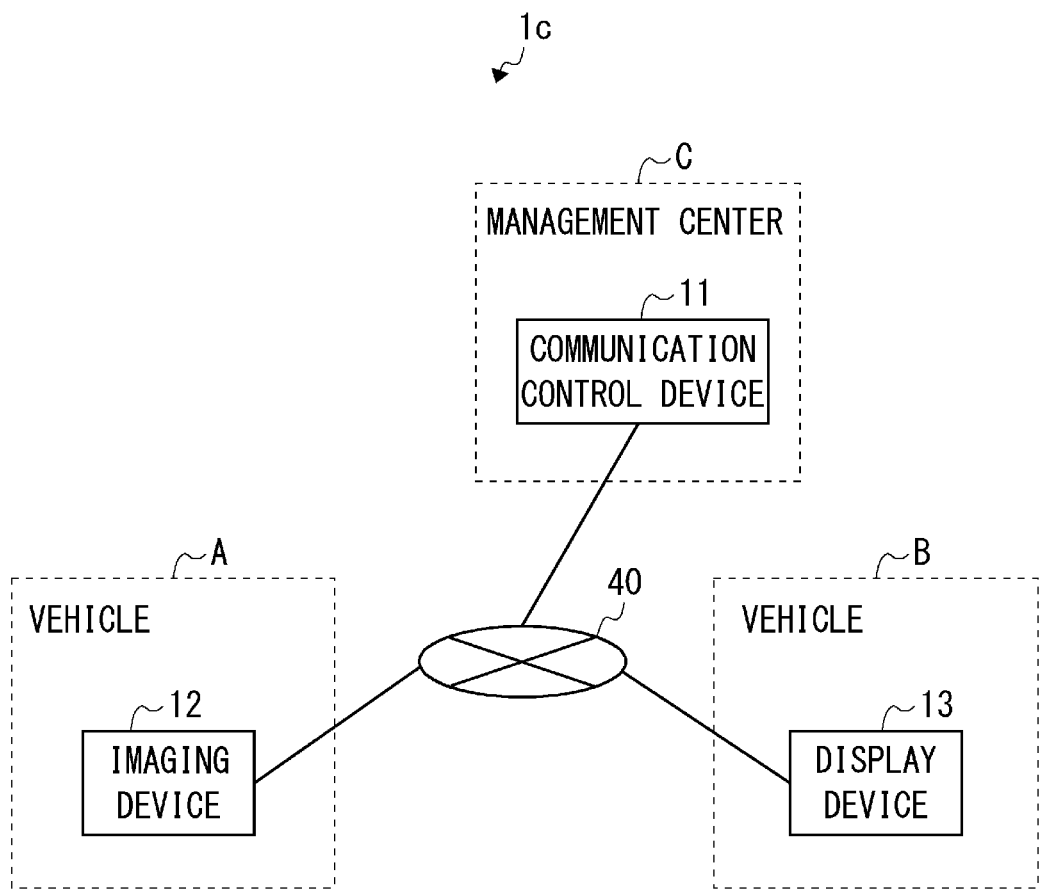
FIG. 9 is a diagram illustrating a third modification of the communication control system illustrated in FIG. 1.

FIG. 9 is a block diagram illustrating a third modification of the communication control system 1 as a communication control system 1c. In the example of FIG. 9, one imaging device 12 is mounted on the vehicle A, and the display device 13 is mounted not in the management center C but on the vehicle. B. In this case, for example, it is considered that the display device 13 is incorporated in a car navigation system of the vehicle B. In the example of FIG. 9, the communication control device 11 is mounted not on the vehicle A but in the management center C and controls communication conditions of video data between the vehicles A and B.

In addition, the communication control device 11 is not limited to a case of controlling transmission conditions of video data transmitted from one or a plurality of imaging devices mounted on one vehicle A to a display device. The communication control device 11 may be configured to control transmission conditions of video data transmitted from one or a plurality of imaging devices respectively mounted on a plurality of vehicles to the display device. Further, the number of display devices that receive the video data is not limited to one and may be plural.

In addition, according to the present disclosure, any processing described as hardware processing can also be implemented by causing a CPU to execute a computer program.

In the above example, the program can be stored using various types of non-transitory computer-readable media and supplied to a computer. The non-transitory computer-readable media include various types of tangible storage media. Examples of the non-transitory computer-readable media include magnetic recording media (for example, a flexible disk, a magnetic tape, or a hard disk drive), magneto-optical recording media (for example, magneto-optical disks). In addition, examples of the non-transitory computer-readable medium include a compact disc-read only memory (CD-ROM), a CD-R, a CD-R/W, a digital versatile disc (DVD), and a semiconductor memory (for example, a mask ROM, a programmable ROM (PROM), an erasable PROM (EPROM), a flash ROM, or a random access memory (RAM)). In addition, the program may be supplied to the computer by various types of transitory computer-readable media. Examples of the transitory computer-readable medium include electric signals, optical signals, and electromagnetic waves. The transitory computer-readable medium can provide the program to the computer via a wired communication line such as electric wires and optical fibers or a wireless communication line.

Some or all of the above example embodiments may be described as the following supplementary notes but are not limited to the following.

(Supplementary Note 1)

A communication control device including:
- an acquisition unit configured to acquire video quality information of first video data on a display device detected, based on a transmission status of the first video data transmitted by a first imaging device and a reception status of the first video data on the display device that receives the first video data via a network; and
- a control unit configured to control a transmission condition of the first video data transmitted from the first imaging device to the display device based on the video quality information of the first video data acquired by the acquisition unit.

(Supplementary Note 2)

The communication control device according to Supplementary Note 1, wherein the control unit is configured to control the transmission condition of the first video data transmitted from the first imaging device to the display device based on imaging priority by the first imaging device, in addition to the video quality information of the first video data.

(Supplementary Note 3)

The communication control device according to Supplementary Note 1 or 2, wherein the control unit includes
- a band estimation unit configured to estimate an available communication band of the first video data from the video quality information of the first video data acquired by the acquisition unit, and
- a parameter determination unit configured to determine the transmission condition of the first video data transmitted from the first imaging device to the display device based on an estimation result by the band estimation unit.

(Supplementary Note 4)

A communication control system including:
- the communication control device according to Supplementary Note 1;
- the first imaging device; and
- the display device configured to receive the first video data transmitted by the first imaging device via the network and display the video, wherein the display device at least includes
a measurement unit configured to measure the reception status of the first video data, and
a feedback transmission unit configured to feed back the measurement result by the measurement unit to the first imaging device via the network, and
the first imaging device at least includes
a first detection unit configured to detect video quality information of the first video data on the display device based on the measurement result by the measurement unit fed back from the display device and the transmission status of the first video data transmitted by the first imaging device.

(Supplementary Note 5)
The communication control system according to Supplementary Note 4, wherein the control unit is configured to control the transmission condition of the first video data transmitted from the first imaging device to the display device based on imaging priority by the first imaging device, in addition to the video quality information of the first video data.

(Supplementary Note 6)
The communication control system according to Supplementary Note 4 or 5, wherein the control unit includes
a band estimation unit configured to estimate an available communication band of the first video data from the video quality information of the first video data acquired by the acquisition unit, and
a parameter determination unit configured to determine the transmission condition of the first video data transmitted from the first imaging device to the display device based on an estimation result by the band estimation unit.

(Supplementary Note 7)
The communication control system according to any one of Supplementary Notes 4 to 6, wherein
the first imaging device further includes
a first encryption unit configured to encrypt the first video data,
a first transmission unit configured to transmit the first video data encrypted by the first encryption unit,
a first reception unit configured to receive the measurement result by the measurement unit, which is fed back by the display device and encrypted, and
a first decryption unit configured to decrypt the measurement result by the measurement unit, which is received by the first reception unit and encrypted,
the display device further includes
a display device-side reception unit configured to receive the first video data transmitted from the first imaging device and encrypted,
a display device-side decryption unit configured to decrypt the first video data, which is received by the display device-side reception unit and encrypted, and
a display device-side encryption unit configured to encrypt the measurement result by the measurement unit, and
the feedback transmission unit is configured to feed back the measurement result by the measurement unit, which is encrypted by the display device-side encryption unit, to the first imaging device via the network.

(Supplementary Note 8)
The communication control system according to any one of Supplementary Notes 4 to 7, wherein
the first imaging device and the communication control device are mounted on a vehicle, and
the display device is installed in a management center.

(Supplementary Note 9)
The communication control system according to any one of Supplementary Notes 4 to 7, wherein
the first imaging device is mounted on a first vehicle,
the display device is mounted on a second vehicle different from the first vehicle, and
the communication control device is installed in a management center.

(Supplementary Note 10)
The communication control system according to Supplementary Note 4, further including a second imaging device, wherein
the display device is configured to further receive second video data transmitted by the second imaging device via the network and display the video,
in the display device,
the measurement unit is configured to further measure a reception status of the second video data,
the feedback transmission unit is configured to further feed back the measurement result by the measurement unit to the second imaging device via the network,
the second imaging device at least includes
a second detection unit configured to detect video quality information of the second video data on the display device based on the measurement result by the measurement unit fed back from the display device and the transmission status of the second video data transmitted by the second imaging device,
in the communication control device,
the acquisition unit is configured to further acquire the video quality information of the second video data detected by the second detection unit, and
the control unit is configured to further control a transmission condition of the second video data transmitted from the second imaging device to the display device based on the video quality information of the second video data acquired by the acquisition unit.

(Supplementary Note 11)
The communication control system according to Supplementary Note 10, wherein the control unit is configured to control the transmission condition of the first video data transmitted from the first imaging device to the display device based on the imaging priority by the first imaging device in addition to the video quality information of the first video data and control the transmission condition of the second video data transmitted from the second imaging device to the display device based on imaging priority by the second imaging device in addition to the video quality information of the second video data.

(Supplementary Note 12)
The communication control system according to Supplementary Note 10 or 11, wherein the control unit includes
a band estimation unit configured to estimate an available communication band of the first video data from the video quality information of the first video data acquired by the acquisition unit and estimate an available communication band of the second video data from the video quality information of the second video data acquired by the acquisition unit, and
a parameter determination unit configured to determine the transmission condition of the first video data transmitted from the first imaging device to the display device and the transmission condition of the second video data transmitted from the second imaging device to the display device, based on an estimation result by the band estimation unit.

(Supplementary Note 13)
The communication control system according to any one of Supplementary Notes 10 to 12, wherein
the first imaging device further includes
a first encryption unit configured to encrypt the first video data,
a first transmission unit configured to transmit the first video data encrypted by the first encryption unit,
a first reception unit configured to receive the measurement result by the measurement unit, which is fed back by the display device and encrypted, and
a first decryption unit configured to decrypt the measurement result by the measurement unit, which is received by the first reception unit and encrypted,
the second imaging device further includes
a second encryption unit configured to encrypt the second video data,
a second transmission unit configured to transmit the second video data encrypted by the second encryption unit,
a second reception unit configured to receive the measurement result by the measurement unit, which is fed back by the display device and encrypted, and
a second decryption unit configured to decrypt the measurement result by the measurement unit, which is received by the second reception unit and encrypted,
the display device further includes
a display device-side reception unit configured to receive the first video data transmitted from the first imaging device and encrypted and the second video data transmitted from the second imaging device and encrypted,
a display device-side decryption unit configured to decrypt the first video data and the second video data, which are received by the display device-side reception unit and encrypted and
a display device-side encryption unit configured to encrypt the measurement result by the measurement unit, and
the feedback transmission unit is configured to feed back the measurement result by the measurement unit, which is encrypted by the display device-side encryption unit, to the first imaging device and the second imaging device via the network.

(Supplementary Note 14)
The communication control system according to any one of Supplementary Notes 10 to 13, wherein
the first imaging device, the second imaging device, and the communication control device are mounted on a vehicle, and
the display device is installed in a management center.

(Supplementary Note 15)
The communication control system according to any one of Supplementary Notes 10 to 13, wherein
the first imaging device and the second imaging device are mounted on a first vehicle,
the display device is mounted on a second vehicle different from the first vehicle, and
the communication control device is installed in a management center.

(Supplementary Note 16)
A communication control method including:
an acquisition step of acquiring video quality information of first video data on a display device detected, based on a transmission status of the first video data transmitted by a first imaging device and a reception status of the first video data on the display device that receives the first video data via a network; and
a control step of controlling a transmission condition of the first video data transmitted from the first imaging device to the display device based on the video quality information of the first video data acquired in the acquisition step.

(Supplementary Note 17)
The communication control method according to Supplementary Note 16, wherein, in the control step, the transmission condition of the first video data transmitted from the first imaging device to the display device is controlled based on imaging priority by the first imaging device, in addition to the video quality information of the first video data.

(Supplementary Note 18)
A non-transitory computer-readable medium storing a communication control program for executing:
an acquisition process of acquiring video quality information of first video data on a display device detected, based on a transmission status of the first video data transmitted by a first imaging device and a reception status of the first video data on the display device that receives the first video data via a network; and
a control process of controlling a transmission condition of the first video data transmitted from the first imaging device to the display device based on the video quality information of the first video data acquired in the acquisition process.

(Supplementary Note 19)
The non-transitory computer-readable medium storing a communication control program according to Supplementary Note 18, wherein, in the control process, the transmission condition of the first video data transmitted from the first imaging device to the display device is controlled based on imaging priority by the first imaging device, in addition to the video quality information of the first video data.

Although the invention of the present application has been described above with reference to the example embodiments, the invention of the present application is not limited to the above example embodiments. Various modifications that can be understood by those skilled in the art can be made to the configuration and details of the invention of the present application within the scope of the invention of the present application.

REFERENCE SIGNS LIST

1 COMMUNICATION CONTROL SYSTEM
1a COMMUNICATION CONTROL SYSTEM
1b COMMUNICATION CONTROL SYSTEM
1c COMMUNICATION CONTROL SYSTEM
5 COMMUNICATION CONTROL SYSTEM
11 COMMUNICATION CONTROL DEVICE
12 IMAGING DEVICE
12_1 to 12_3 IMAGING DEVICE
13 DISPLAY DEVICE
40 NETWORK
50 NETWORK
51 COMMUNICATION CONTROL DEVICE
52_1 to 52_3 IMAGING DEVICE
53 DISPLAY DEVICE
111 COMMUNICATION UNIT
112 CONTROL UNIT
121 IMAGING UNIT
122 COMMUNICATION UNIT
123 ENCRYPTION UNIT
124 DECRYPTION UNIT
125 VIDEO QUALITY INFORMATION DETECTION UNIT

126 CONTROL UNIT
131 COMMUNICATION UNIT
132 DISPLAY UNIT
133 DECRYPTION UNIT
134 ENCRYPTION UNIT
135 RECEPTION STATUS MEASUREMENT UNIT
1121 BAND ESTIMATION UNIT
1122 PARAMETER DETERMINATION UNIT
A VEHICLE
B VEHICLE
C MANAGEMENT CENTER

What is claimed is:

1. A communication control system comprising:
a communication control device;
a first imaging device;
a second imaging device; and
a display device configured to receive first video data transmitted by the first imaging device via a network and display the first video and second video data transmitted by the second imaging device via the network and display the second video,
wherein the communication control device includes:
at least one first memory storing first program instructions; and
at least one first processor configured to execute the first program instructions stored in the first memory to:
acquire video quality information of the first video data on the display device detected, based on a transmission status of the first video data transmitted by the first imaging device and a reception status of the first video data on the display device that receives the first video data via the network and video quality information of the second video data on the display device detected, based on a transmission status of the second video data transmitted by the second imaging device and a reception status of the second video data on the display device that receives the second video data via the network; and
control a transmission condition of the first video data transmitted from the first imaging device to the display device based on the video quality information of the first video data and a transmission condition of the second video data transmitted from the second imaging device to the display device based on the video quality information of the second video data,
wherein the display device includes:
at least one second memory storing second program instructions; and
at least one second processor configured to execute the second program instructions stored in the second memory to:
measure the reception status of the first video data and the reception status of the second video data; and
perform feedback transmission of measurement results to the first imaging device and the second imaging device via the network,
wherein the first imaging device includes:
at least one third memory storing third program instructions; and
at least one third processor configured to execute the third program instructions stored in the third memory to:
detect video quality information of the first video data on the display device based on the measurement result fed back from the display device and the transmission status of the first video data transmitted by the first imaging device,
wherein the second imaging device includes:
at least one fourth memory storing fourth program instructions; and
at least one fourth processor configured to execute the fourth program instructions stored in the fourth memory to:
detect video quality information of the second video data on the display device based on the measurement result fed back from the display device and the transmission status of the second video data transmitted by the second imaging device,
wherein in the first imaging device, the at least one third processor is further configured to execute the third program instructions stored in the third memory to:
encrypt the first video data;
transmit the encrypted first video data;
receive the measurement result about the reception status of the first video data, which is fed back by the display device and encrypted; and
decrypt the encrypted measurement result about the reception status of the first video data,
wherein in the second imaging device, the at least one fourth processor is further configured to execute the fourth program instructions stored in the fourth memory to:
encrypt the second video data;
transmit the encrypted second video data;
receive the encrypted measurement result about the reception status of the second video data, which is fed back by the display device; and
decrypt the encrypted measurement result about the reception status of the second video data,
wherein in the display device, the at least one second processor is further configured to execute the second program instructions stored in the second memory to:
receive the encrypted first video data transmitted from the first imaging device and the encrypted second video data transmitted from the second imaging device;
decrypt the encrypted first video data and the encrypted second video data; and
encrypt the measurement result about the reception status of the first video data and the measurement result about the reception status of the second video data,
and wherein in the feedback transmission, the encrypted measurement result about the reception status of the first video data is fed back to the first imaging device via the network and the encrypted measurement result about the reception status of the second video data is fed back to the second imaging device via the network.

2. The communication control system according to claim 1, wherein in the controlling of the transmission condition, the transmission condition of the first video data transmitted from the first imaging device to the display device is controlled based on imaging priority by the first imaging device in addition to the video quality information of the first video data and the transmission condition of the second video data transmitted from the second imaging device to the display device is controlled based on imaging priority by the second imaging device in addition to the video quality information of the second video data.

3. The communication control system according to claim 1, wherein in the controlling of the transmission condition, an available communication band of the first video data is estimated from the video quality information of the first video data and an available communication band of the second video data is estimated from the video quality information of the second video data, and the transmission condition of the first video data transmitted from the first imaging device to the display device is determined and the transmission condition of the second video data transmitted from the second imaging device to the display device is determined, based on an estimation result.

4. The communication control system according to claim 1, wherein
the first imaging device, the second imaging device, and the communication control device are mounted on a vehicle, and
the display device is installed in a management center.

5. The communication control system according to claim 1, wherein
the first imaging device and the second imaging device are mounted on a first vehicle,
the display device is mounted on a second vehicle different from the first vehicle, and
the communication control device is installed in a management center.

6. A method for controlling a communication control system:
wherein the communication control system comprises:
a communication control device;
a first imaging device;
a second imaging device; and
a display device,
wherein the method comprises:
by the display device:
receiving first video data transmitted by the first imaging device via a network;
displaying the first video and second video data transmitted by the second imaging device via the network and display the second video;
by the communication control device:
acquiring video quality information of the first video data on the display device detected, based on a transmission status of the first video data transmitted by the first imaging device and a reception status of the first video data on the display device that receives the first video data via the network and video quality information of the second video data on the display device detected, based on a transmission status of the second video data transmitted by the second imaging device and a reception status of the second video data on the display device that receives the second video data via the network;
controlling a transmission condition of the first video data transmitted from the first imaging device to the display device based on the video quality information of the first video data and a transmission condition of the second video data transmitted from the second imaging device to the display device based on the video quality information of the second video data;
by the display device:
measuring the reception status of the first video data and the reception status of the second video data;
performing feedback transmission of measurement results to the first imaging device and the second imaging device via the network;

by the first imaging device:
detecting video quality information of the first video data on the display device based on the measurement result fed back from the display device and the transmission status of the first video data transmitted by the first imaging device;
by the second imaging device:
detecting video quality information of the second video data on the display device based on the measurement result fed back from the display device and the transmission status of the second video data transmitted by the second imaging device;
by the first imaging device:
encrypting the first video data;
transmitting the encrypted first video data;
receiving the measurement result about the reception status of the first video data, which is fed back by the display device and encrypted;
decrypting the encrypted measurement result about the reception status of the first video data;
by the second imaging device:
encrypting the second video data;
transmitting the encrypted second video data;
receiving the encrypted measurement result about the reception status of the second video data, which is fed back by the display device;
decrypting the encrypted measurement result about the reception status of the second video data;
by the display device:
receiving the encrypted first video data transmitted from the first imaging device and the encrypted second video data transmitted from the second imaging device;
decrypting the encrypted first video data and the encrypted second video data;
encrypting the measurement result about the reception status of the first video data and the measurement result about the reception status of the second video data,
and wherein in the feedback transmission, the encrypted measurement result about the reception status of the first video data is fed back to the first imaging device via the network and the encrypted measurement result about the reception status of the second video data is fed back to the second imaging device via the network.

7. A non-transitory computer-readable medium storing a communication control program for performing processing for controlling a communication control system,
wherein the communication control system comprises:
a communication control device;
a first imaging device;
a second imaging device; and
a display device,
wherein the processing comprises:
by the display device:
receiving first video data transmitted by the first imaging device via a network;
displaying the first video and second video data transmitted by the second imaging device via the network and display the second video;
by the communication control device:
acquiring video quality information of the first video data on the display device detected, based on a transmission status of the first video data transmitted by the first imaging device and a reception status of the first video data on the display device that receives the first video data via the network and video quality information of the second video data on the display device detected, based on a transmission status of the second video data transmitted by the second imaging device and a reception status of the second video data on the display device that receives the second video data via the network;

controlling a transmission condition of the first video data transmitted from the first imaging device to the display device based on the video quality information of the first video data and a transmission condition of the second video data transmitted from the second imaging device to the display device based on the video quality information of the second video data;

by the display device:
measuring the reception status of the first video data and the reception status of the second video data;
performing feedback transmission of measurement results to the first imaging device and the second imaging device via the network;

by the first imaging device:
detecting video quality information of the first video data on the display device based on the measurement result fed back from the display device and the transmission status of the first video data transmitted by the first imaging device;

by the second imaging device:
detecting video quality information of the second video data on the display device based on the measurement result fed back from the display device and the transmission status of the second video data transmitted by the second imaging device;

by the first imaging device:
encrypting the first video data;
transmitting the encrypted first video data;
receiving the measurement result about the reception status of the first video data, which is fed back by the display device and encrypted;
decrypting the encrypted measurement result about the reception status of the first video data;

by the second imaging device:
encrypting the second video data;
transmitting the encrypted second video data;
receiving the encrypted measurement result about the reception status of the second video data, which is fed back by the display device;
decrypting the encrypted measurement result about the reception status of the second video data;

by the display device:
receiving the encrypted first video data transmitted from the first imaging device and the encrypted second video data transmitted from the second imaging device;
decrypting the encrypted first video data and the encrypted second video data;
encrypting the measurement result about the reception status of the first video data and the measurement result about the reception status of the second video data, and wherein in the feedback transmission, the encrypted measurement result about the reception status of the first video data is fed back to the first imaging device via the network and the encrypted measurement result about the reception status of the second video data is fed back to the second imaging device via the network.

* * * * *